(12) United States Patent
Carnathan et al.

(10) Patent No.: US 8,165,994 B2
(45) Date of Patent: Apr. 24, 2012

(54) INTEGRATED GOVERNANCE AND VERSION AUDIT LOGGING

(75) Inventors: Jesse G Carnathan, Seattle, WA (US); Raymond David Ducolon, Auburn, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 11/959,585

(22) Filed: Dec. 19, 2007

(65) Prior Publication Data

US 2009/0164496 A1   Jun. 25, 2009

(51) Int. Cl.
*G06F 17/30* (2006.01)

(52) U.S. Cl. ........ 707/648; 707/643; 707/644; 707/645; 707/646; 707/647; 707/650; 707/651; 707/652; 707/653; 707/654

(58) Field of Classification Search ............... 707/648, 707/643–647, 650–654
See application file for complete search history.

(56) References Cited

U.S. PATENT DOCUMENTS

| | | | |
|---|---|---|---|
| 5,561,795 A | 10/1996 | Sarkar | |
| 5,574,898 A | 11/1996 | Leblang et al. | |
| 5,649,200 A | 7/1997 | Leblang et al. | |
| 6,453,324 B1 | 9/2002 | Baisley et al. | |
| 7,099,897 B2 * | 8/2006 | Huras et al. | 707/648 |
| 7,194,489 B2 | 3/2007 | Bentley et al. | |
| 7,200,777 B1 | 4/2007 | Bouchee | |
| 7,251,669 B1 | 7/2007 | Arora | |
| 2004/0139127 A1 * | 7/2004 | Pofelski | 707/203 |
| 2005/0075916 A1 | 4/2005 | Lathram et al. | |
| 2005/0234909 A1 | 10/2005 | Bade et al. | |

OTHER PUBLICATIONS

Nielson, Paul, SQL Server 2005 Bible, Nov. 6, 2006, John Wiley & Sons, p. 516-528, 617-622, 810-811. ISBN 978-0-764-54256-5.*
Khan, Shahed, Implementing Message Priority in SQL Service Broker, Sep. 5, 2006, <http://geekswithblogs.net/shahed/archive/2006/09/05/90258.aspx>, p. 1-2.*
Nielson, Paul, SQL Server 2005 Bible, Nov. 6, 2006, John Wiley & Sons, p. 483. ISBN 978-0-764-54256-5.*
Mazer, "Ten Business Benefits of Effective Data Auditing", 1105 Media Inc.,1998-2007.
Burleson, "Database Auditing for Risk Management and Regulatory Compliance", Burleson Enterprises Inc., 1996-2007.

* cited by examiner

*Primary Examiner* — Frantz Coby

(57) ABSTRACT

A server auditing process that stores only a single up-to-date data record along with the differences relative to previous changes in the record that allow the user to move "backward in time" to recreate previous values. The auditing feature introduces a baseline database table and a difference database table for each existing database table. The baseline table stores the most recent auditing data and the differences table complements the baseline table by storing pairs in the form of attribute name and previous value. By applying difference rows to baseline data, the user is able to recreate the data as it existed at any given timestamp and at a minimal storage cost. The architecture minimizes the impact of auditing on system performance by employing an asynchronous priority queue so that task processing is deferred until the system has adequate resources and other work is not affected.

20 Claims, 9 Drawing Sheets

TASK TABLE ~ 300

| TASK UID | TASK NAME | TASK START DATE | TASK PRIORITY |
|---|---|---|---|
| GUID1 | PROP | 1/23/XX | 50 |

| TASK UID | TASK NAME | TASK START DATE | TASK PRIORITY |
|---|---|---|---|
| GUID1 | PROP TEMP | 1/23/XX | 50 |

| TASK UID | TASK NAME | TASK START DATE | TASK PRIORITY |
|---|---|---|---|
| GUID1 | PROP TEMP | 3/12/XX | 25 |

| TASK UID | TASK NAME | TASK START DATE | TASK PRIORITY |
|---|---|---|---|
| GUID1 | UPDATE PROP | 3/12/XX | 25 |

306 ↗

BASELINE TABLE ~ 302

| TASK UID | TASK NAME | TASK START DATE | TASK PRIORITY | VERSION COUNTER |
|---|---|---|---|---|
| GUID1 | PROP | 1/23/XX | 50 | 0 |

| TASK UID | TASK NAME | TASK START DATE | TASK PRIORITY | VERSION COUNTER |
|---|---|---|---|---|
| GUID1 | PROP TEMP | 1/23/XX | 50 | 1 |

| TASK UID | TASK NAME | TASK START DATE | TASK PRIORITY | VERSION COUNTER |
|---|---|---|---|---|
| GUID1 | PROP TEMP | 3/12/XX | 25 | 2 |

| TASK UID | TASK NAME | TASK START DATE | TASK PRIORITY | VERSION COUNTER |
|---|---|---|---|---|
| GUID1 | UPDATE PROP | 3/12/XX | 25 | 3 |

DIFFERENCES TABLE ~ 304

| FIELD NAME | OLD VALUE | VERSION COUNTER |
|---|---|---|
| - | - | - |

| FIELD NAME | OLD VALUE | VERSION COUNTER |
|---|---|---|
| TASK NAME | PROP | 0 |

| FIELD NAME | OLD VALUE | VERSION COUNTER |
|---|---|---|
| TASK NAME | PROP | 0 |
| TASK START DATE | 1/23/XX | 1 |
| TASK PRIORITY | 50 | 1 |

| FIELD NAME | OLD VALUE | VERSION COUNTER |
|---|---|---|
| TASK NAME | PROP | 0 |
| TASK START DATE | 1/23/XX | 1 |
| TASK PRIORITY | 50 | 1 |
| TASK NAME | PROP TEMP | 2 |

*FIG. 3*

MANAGE AUDITING

| Feature Name | Description | Audit Changes |
|---|---|---|
| Assignment Status | Submitted and approved assignment status updates | Yes |
| Enterprise Custom Fields | Enterprise custom field definitions including names, lookup tables, formulas, graphical indicators, and other field properties | No |
| Enterprise Lookup Tables | Enterprise lookup table definitions including names, masks, and table values | Yes |
| Enterprise Resources | Enterprise resources including enterprise resource custom field values | Yes |

INTEGRATED GOVERNANCE AND VERSION AUDIT LOGGING

BACKGROUND

In the corporate world of fiscal accountability, data auditing has become an important element for enterprise software. Reports on data access may now be required by law such as Sarbanes-Oxley for investor protection and HIPPA (Health Insurance Portability and Accountability Act) for medical records privacy. Consider that a corporation is required to maintain historical records for financial custom fields in a project application. Conventional project management tools lack the ability to efficiently record historical changes that would ensure that the data is changed only in intended ways and only by authorized users. Existing software does not have the functionality necessary to audit changes to those fields. Moreover, such processes should be performed with server performance and affects on the database size in mind. As databases get larger the hardware and software requirements for efficient and qualitative auditing become increasingly important.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides the auditing of previous values, including what data changed, which user made the change, and the rollback of the data to a previous version, if desired. The architecture minimizes the impact of auditing on system performance by employing an asynchronous priority queue so that task processing is deferred until the system has adequate resources and other work is not affected. Synchronous operations are automatically processed before auditing, and other non-auditing asynchronous operations receive a higher priority than auditing operations. Thus, the auditing processing only occurs during periods of relative inactivity for the server system.

The auditing process is also implemented in such a way as to minimize the impact on database size. The auditing technique stores only a single up-to-date data record along with the differences relative to previous changes in the record that allow the user to move "backward in time" to recreate previous values. In support thereof, the auditing feature introduces a baseline database table and a difference database table for each existing database table. The baseline table stores the most recent auditing data, which is essentially a duplicate of the active database table plus some specific auditing attributes. The differences table complements the baseline table by storing pairs in the form of attribute name and previous value. By applying difference rows to baseline data, the user is able to recreate the data as it existed at any given timestamp and at a minimal storage cost.

The architecture also employs triggers that allow a response to database events with additional actions, the events occurring at the database layer. The triggers are used to capture changes that occur at the lowest level of the system. A trigger can be added to a database table such that a procedure is called after an insert, update, or delete, on that table, for example. The trigger provides the procedure with information obtained from Inserted and Deleted tables, which are populated with data that has changed. The information is stored in an auditing messages table along with the table that was updated, a username, and a timestamp.

A queue timer job alerts the auditing system about updates to the tables and provides data for differences calculations. The timer job allows for clearing the auditing messages table frequently and creating low-priority jobs that defer auditing processing to a time that imposes a minimal impact on system load.

The architecture provides businesses with the information desired to comply with regulatory governance and oversight regulations, while also providing a distinct user-benefit of allowing the rollback of data to previous states with minimal impact on system performance and database size.

The auditing architecture at least minimizes the impact on general server resources. Moreover, the architecture is sufficiently generic to work for server features including custom fields, resources, assignment status updates, etc., features which can be associated with project servers.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

BRIEF DESCRIPTION OF THE DRAWINGS

FIG. 3 illustrates an example sequence of task updates and the corresponding auditing table activity.

FIG. 7 illustrates an exemplary user interface for managing auditing in accordance with the disclosed auditing architecture.

DETAILED DESCRIPTION

Figure 1:
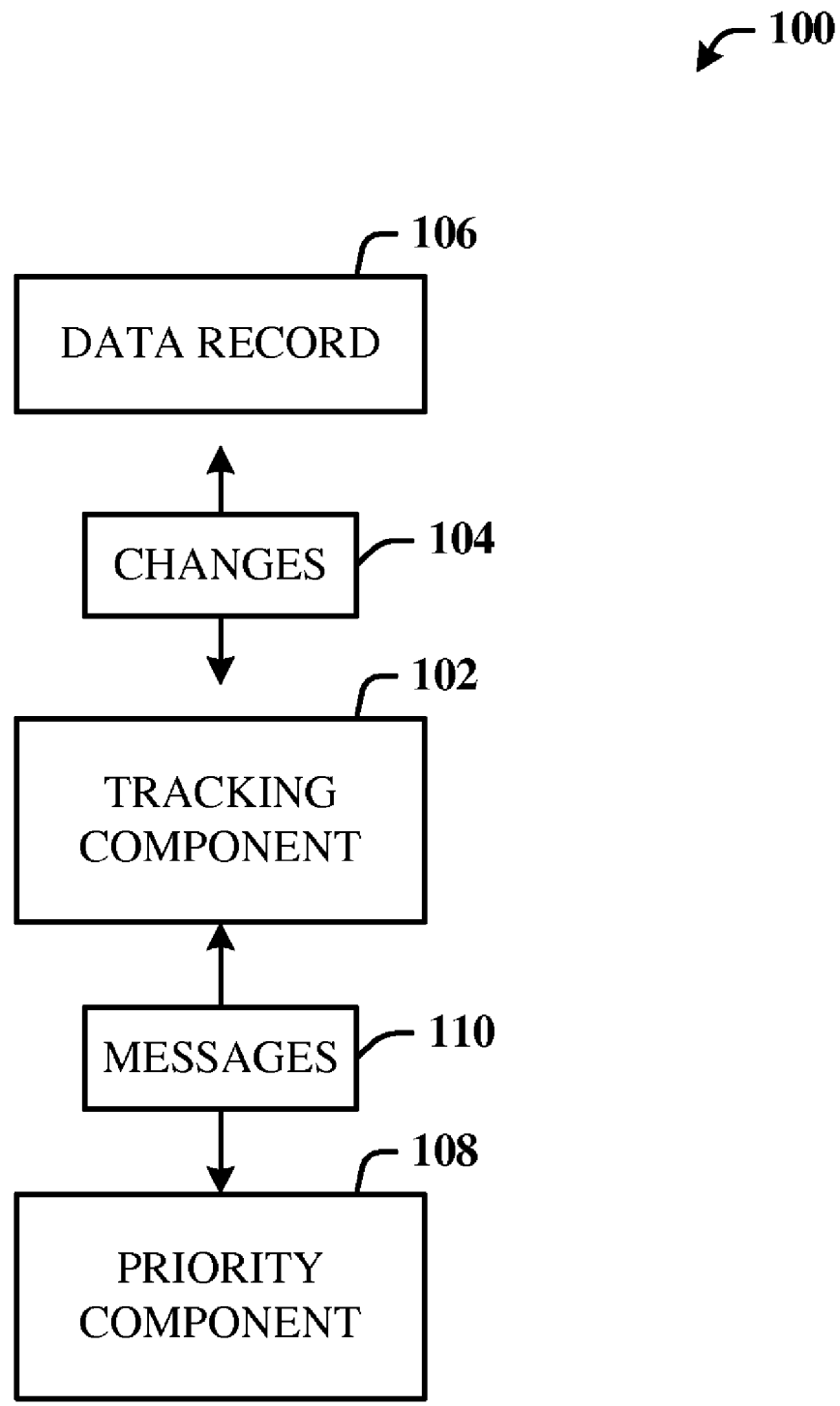
FIG. 1 illustrates a computer-implemented auditing system.

The disclosed architecture discloses a new technique that enables server application (e.g., project management) users to audit data and see historical changes on the server, both of these scenarios hereinafter referred to as "auditing". In particular, the auditing technique allows the auditor to determine which users have made changes to a particular item of data (e.g., the user that modified a project PI or the user who set the permissions on Joe Smith) and what were the changes (e.g., the values assigned to the status custom field of project PI in the past, the exceptions added by Jane to the engineering calendar).

In many cases the auditing feature also allows the user to read historical data as a snapshot of a previous timestamp. In these cases, the user can attempt to save the snapshot to "undo" operations that have subsequently occurred. For instance, with the use of the auditing feature, the user will is able to resave a lookup table definition that has been updated many times to revert to a previous version.

The auditing technique supports at least two primary goals. Firstly, the technique minimizes the impact on general server performance. In particular, the feature imposes a negligible impact on the performance of common operations such as task save and publish. Additionally, the technique only increases the database size, as necessary. Secondly, the technique is sufficiently generic to work for all server features. The technique is extensible such that new business objects, for example, that are added in the future can easily plug into the architecture.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented auditing system 100. The system 100 include a tracking component 102 that is dynamically generated for tracking changes 104 in a data record 106 as part of an auditing process. The system 100 also includes a priority component 108 for asynchronously processing the changes 104 according to priority-based queue messages 110. The auditing process includes auditing messages. This is in contrast to non-auditing messages for synchronous operations that are automatically processed before auditing and other non-auditing asynchronous operations. The priority component 108 defers the processing of the auditing messages to a time of reduced system load by assigning lower-priorities to the auditing messages relative to priorities assigned to the non-auditing messages.

The auditing system lower-priority messages on the server queue that can be processed asynchronously only after all of the higher priority operations complete. For instance, consider the following sequence of operations on a server (e.g., a project server) using a queue with two priorities (H)igh and (L)ow and timestamp (TS).

| TS | Operation | Queue messages |
|---|---|---|
| 0 | Project P1 is saved. A high-priority queue message (SaveP1) is created to process the project save. | SaveP1 (H) |
| 1 | Resource R1's permissions are updated synchronously, affecting the database during timestamp 1; a low-priority auditing message (AuditR1) is added to the queue. | SaveP1 (H), AuditR1 (L) |
| 2 | Project P2 is saved. A high-priority queue message (SaveP2) is created to process the project save. | SaveP1 (H), AuditR1 (L), SaveP2 (H) |
| 3 | Queue message SaveP1 is processed, causing the project to be saved to the database and a low-priority auditing message (AuditP1) is added to the queue. | AuditR1 (L), SaveP2 (H), AuditP1 (L) |
| 4 | Queue message SaveP2 is processed, since the only high-priority message on the queue, causing the project to be saved to the database and another low-priority auditing message (AuditP2) is added to the queue. | AuditR1 (L), AuditP1 (L), AuditP2 (L) |
| 5 | Queue message AuditR1 is processed, causing the resource permission changes to be pushed into the auditing tables. | AuditP1 (L), AuditP2 (L) |
| 6 | Project P3 is published. A high-priority queue message (PubP3) is created to process the project publish. | AuditP1 (L), AuditP2 (L), PubP3 (H) |
| 7 | Queue message PubP3 is processed, since the only high-priority message on the queue, causing the project data to be copied into the published store and a low-priority auditing message (AuditP3) is added to the queue. | AuditP1 (L), AuditP2 (L), AuditP3 (H) |
| 8 | Queue message AuditP1 is processed, causing the project data to be pushed into the auditing store on the working database. | AuditP2 (L), AuditP3 (H) |
| 9 | Queue message AuditP2 is processed, causing the project data to be pushed into the auditing store on the working database. | AuditP3 (H) |
| 10 | Queue message AuditP3 is processed, causing the project data to be pushed into the auditing store on the published database. | |

The example, although simplistic, illustrates how auditing is deferred until the server can handle the auditing process without impacting normal operations. In short, any synchronous API call is automatically processed before auditing, and any other asynchronous call gets a higher priority than auditing. Thus, in one implementation, the audit processing occurs only when the system is not processing non-auditing operations. In an alternative implementation, a threshold can be set such that audit processing occurs when the system load drops below the threshold. For example, the threshold can be set to twenty percent, indicating that audit processing will occur when the system load is less than or equal to twenty percent of the total possible load.

Figure 2:
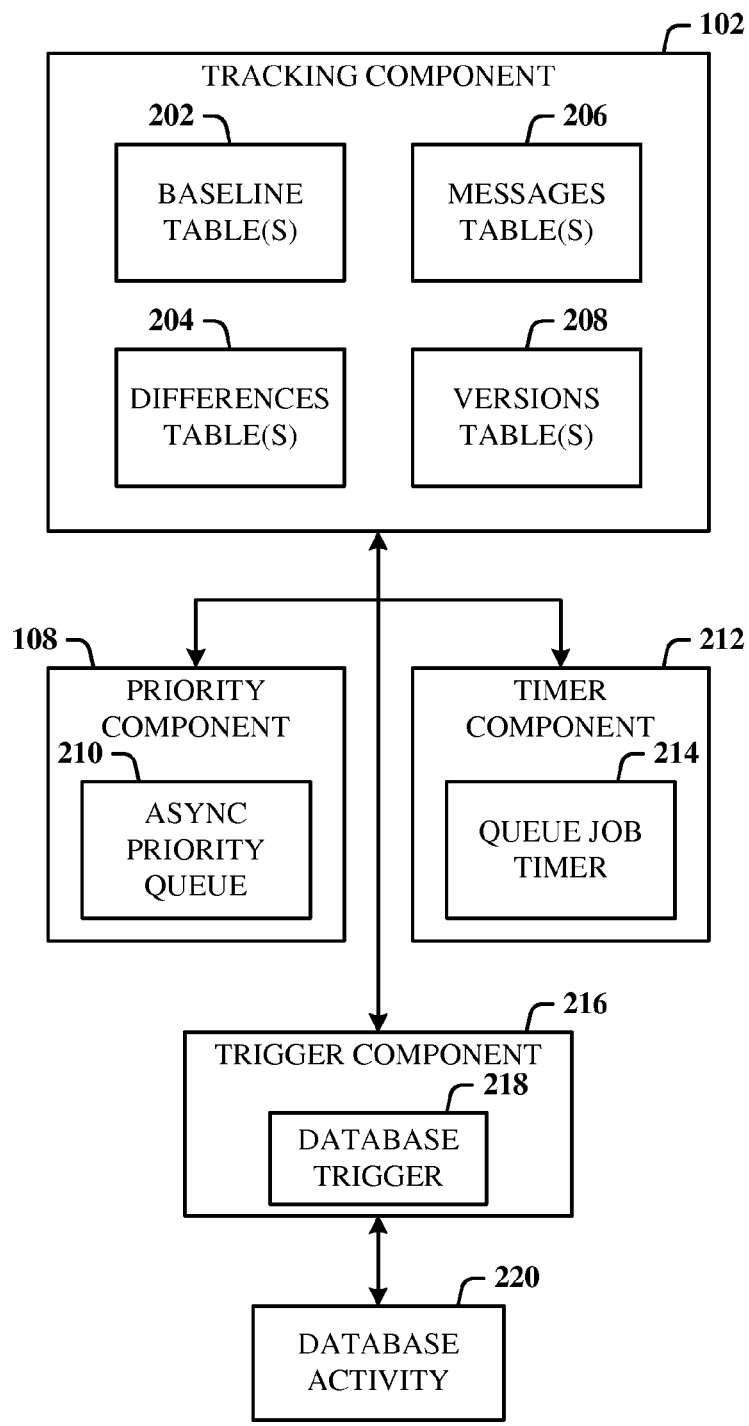
FIG. 2 illustrates a more detailed system for auditing server data.

FIG. 2 illustrates a more detailed system 200 for auditing server data. The auditing system 200 illustrates the tracking component 102 including one or more of the following: auditing baseline tables 202, auditing differences tables 204, auditing messages tables 206, and auditing versions tables 208. For example, the table mix can include a message table per system or a messages table per feature to optimize scalability and feature throughput (e.g., project, portfolio, etc.), a version table per feature and, a baseline table and a differences table per feature table (and oftentimes, many feature tables per feature). The tracking component 102 interfaces to the priority component 108, shown here further including an asynchronous priority queue 210. A timer component 212 generates and processes a timer job 214. A trigger component 216 includes a database trigger 218 that fires based on database activity 220 (e.g., insert, update, delete) on a database table defined to trigger dynamic generation of the tracking component 102 and associated functionality (e.g., tables, queues, messages). For example, the trigger component 216 and other auditing functions can be dynamically generated based on database activity (or trigger) associated with an insert, delete, and/or update operation on a database table.

The auditing baseline table 202 includes a single record that stores the latest (or more recent up-to-date) information of the record. The auditing differences table 204 stores incremental differences information related to the changes to the record, the incremental difference information in the form an attribute name and a previous value associated with the record.

The asynchronous priority queue 210 stores auditing messages and non-auditing messages related to database operations. The priority component 108 defers processing of the auditing messages to a time of reduced system load by assigning lower-priorities to the auditing messages relative to priorities assigned to the non-auditing messages. The timer component 212 executes the timer job 214, which facilitates the clearing auditing messages from the auditing messages table 206 and creates low-priority jobs that defer the auditing process to times of reduced system load. The versions table 208 uniquely identifies table updates associated with a single logical database operation as a single version of a feature.

A most naive way to maintain historical records on a database system is to continuously create new rows, thereby never overwriting previous values. Such a design allows the system to quickly read earlier values, but has a shortcoming in scalability. One implementation for the auditing feature of the server only stores a single up-to-date record along with the differences that allow moving "backward in time" to recreate previous values. Although the single up-to-date record implementation is described throughout this description, it is to be understood that the architecture can be extended to use multiple rows to improve read/access performance.

The following description is described in the context of a project server and project tables; however, it is to be understood that the disclosed auditing architecture can apply to any server application. As previously indicated, the auditing feature for the single historical row design introduces the baseline table 202 and the differences table 204 for each project server database table. The baseline table 202 stores the most recent auditing data, which is essentially a duplicate of project table records, plus a few specific auditing attributes. Although this information initially seems redundant given the project tables, the auditing data is isolated from the non-auditing data due to the deferment model described earlier. In particular, the project tables cannot be relied upon for up-to-date information because multiple updates can occur before the data is actually audited. If this happens and reliance is placed on the project tables for the up-to-date information, multiple versions will appear identical and the intermediate updates will be lost.

Instead, the baseline table 202 stores the newest information that the auditing system knows, which can mirror the project tables, but may be behind the project table data in time. The differences table 204 complements the baseline table 202 by storing attribute name and previous value pairs. By applying difference rows to baseline data, the data can be recreated as the data existed at any given timestamp.

FIG. 3 illustrates an example sequence of task updates and the corresponding auditing table activity. Consider a sequence of task updates and how a Task table 300, Auditing Baseline table 302, and Auditing Differences table 304 relate to each other. Note that all of the auditing fields are not shown in the interest of simplicity; additional auditing fields will be discussed hereinbelow.

Initially in the Task table 300, a task having an identifier GUID1 and named "Proposal (PROP)" exists on the server and begins on Jan. 23, 2007. The priority is set to fifty. The Baseline table 302 includes the task identifier (GUID1), task name (PROP), start date (1/23/xx), task priority (50) (not to be confused with the priority-based queue), and a version counter (initialized as zero). The Differences table 304 includes the field name (null), old value (null) and version counter (null).

Next, the task name is changed to "Proposal template (PROP TEMP)". The queue messages are processed and the data is reflected in both the project and auditing tables. In the Task table 300, the task name is changed from PROP to PROP TEMP. In the Baseline table 302, the task name is changed to PROP TEMP and the version counter is incremented to one. In the Differences table 304 stores its first entry of the filed name being task name, the old value being PROP and the version counter as zero.

Next, the task start date is changed to Mar. 12, 2007 and the priority is changed from fifty to twenty-five. In the Task table 300, the task start date is changed from 1/23/xx to 3/12/xx and the priority is changed to twenty-five. In the Baseline table 302, the task start date is changed from 1/23/xx to 3/12/xx, the priority is set to twenty-five, and the version counter is incremented to two. The Differences table 304 stores two more entries: the field name of task start date, the old values of 1/23/xx, and version counter value of one; and the field name of task priority, the old value of fifty, and the version counter of one.

Lastly, the task name is changed again to UPDATE PROP. In the Task table 300, the task name is changed from PROP TEMP to UPDATE PROP. In the Baseline table 302, the task name is changed from PROP TEMP to UPDATE PROP, and the version counter is incremented to three. The Differences table 304 stores an additional entry of the field name being task name, the old value of PROP TEMP, and version counter value of two.

As can be seen by examining the Baseline table 302 and Differences table 304, the data can be easily recreated at any version counter in time. This is accomplished by beginning with the data in the Baseline table 302 and applying the difference rows from the highest version counter down to the desired version. Once all of the old values have been applied to the data, the resulting data is that which existed at the desired timestamp.

Optimizations can be applied to improve performance. For instance, if interested in version zero of the task, there is no need to apply the task name change from version two because it will be overwritten. More generally, the user only needs to apply a single difference row per attribute—the row with the lowest version counter that is greater than or equal to the desired version. This design allows the recreation of the data at any point in time and only consumes a minimal amount of database storage to achieve the task.

Following is a more detailed description of the auditing architecture. The auditing feature can be thought of as a number of distinct phases that are be completed before historical data becomes available to the user.

Many project server operations affect multiple database tables yet are considered a single logical update to the user. Although the auditing feature stores historical data on a per-table basis, all of the updates from a single operation are desired to appear as one version in the auditing architecture, regardless of the number of tables that are affected.

Hence, the auditing feature introduces version tables, which are top-level tables that uniquely identify versions of features, rather than versions of records. For example, if a project save causes task updates, assignment updates, and custom field updates, the user thinks of the save as an update to a single entity, namely the project. Similarly, if a lookup table definition update affects masks structure rows, lookup table structure rows, and value rows, logically the user is only updating a single lookup table. Therefore, by considering updates on a per-feature basis, all of the related updates can be grouped into a single version. In order to provide business objects the ability to write into version tables, the auditing business object can provide the following public method.

```
internal void CreateAuditingMessage(DataStoreEnum store,
   AuditingContants.MessageType messageType, Guid featureUid,
   DataSet updates)
```

The parameter store indicates to the auditing architecture whether the version will be written to the working or published database. The messageType parameter indicates whether the user is creating a BeginVersion or an EndVersion. The featureUid indicates which feature is being updated. Finally, the updates dataset contains a table with the primary keys of the objects that are being updated.

Figure 4:
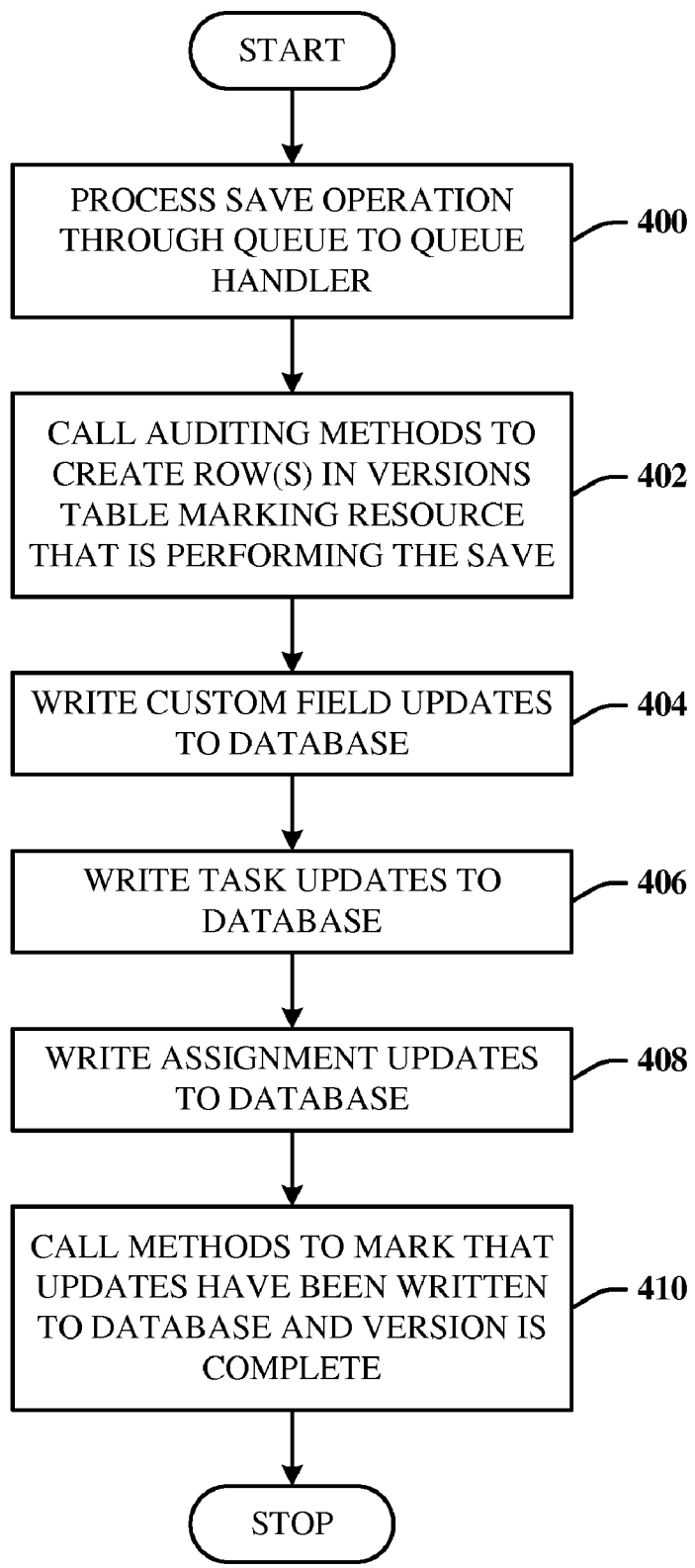
FIG. 4 illustrates an exemplary control flow associated with the public method.

FIG. 4 illustrates an exemplary control flow associated with the public method. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 400, a save operation is passed through the queue and is received by the queue handler. At 402, on a first call to the method (CreateAuditingMessage) the auditing architecture creates a row in the task version table marking the resource that is performing the save, the timestamp, the identifier of the project, a version counter, and a flag that indicates that the version is not yet complete. The first call passes workingStore, BeginVersion, projectFeature and projUid to the method. This is exemplified at 404 where custom field updates are written to the database, at 406 where task updates are written to the database, and at 408 where assignment updates are written to the database. On the second call to the method (CreateAuditingMessage), at 410, the auditing architecture will mark that all updates have been written to the database and the version is complete. The second call also passes workingStore, BeginVersion, projectFeature and projUid to the method.

An exemplary schema for the versions table can be as follows:

| | |
|---|---|
| PK_COL | SOME_TYPE NOT NULL, |
| MOD_BY_RES_UID | UNIQUEIDENTIFIER NOT NULL, |
| MOD_BY_DB_USERNAME | NVARCHAR(128), |
| MOD_DATE | DATETIME NOT NULL, |
| VERSION_NAME | NVARCHAR(255), |
| VERSION_READY | BIT NOT NULL, |
| OBJECT_VERSION_COUNTER | INT NOT NULL |

Since each audit feature has its own version table, an attribute named PK_COL does not actually appear in any table; the field has a different name depending on the feature. The field (or fields) is populated with the primary key value of the object that is being updated. The MOD_BY_RES_UID column is used to indicate which resource performed the update and the MOD_BY_DB_USERNAME indicates the database user that performed the update. The MOD_DATE column indicates the timestamp of the update. The VERSION_NAME field allows users to associate names with individual versions. The VERSION_READY flag is used during the in-between state to indicate whether all updates of a version have been written to the database. Finally, the OBJECT_VERSION_COUNTER field is used to associate versions across tables and will be discussed in greater detail below.

With respect to triggers, a common point that auditing could use to completely capture database activity was at the database layer itself. Database triggers are designed specifically to allow users to respond to database events with additional actions. For instance, a trigger can be added to a table such that a procedure is called after any insert, update, or delete on that table.

Furthermore, the trigger provides the procedure with two supplemental tables, the INSERTED table and the DELETED table, which are populated with the data that has changed.

There are a number of solutions that allow the use of triggers to defer the auditing processing. First, SQL server CLR (common language runtime) integration could be used to call into a business layer WebMethod. The WebMethod would create a project server queue message that included the inserted and deleted table information, and some time later when the server had time to process the message, the information would be used to calculate the auditing data.

Second, a SQL server service broker could be used to create a SQL queue that has a lower priority than any of the project operations. The trigger would create messages for the SQL queue, and those messages would only be processed if the server did not have other core operations to perform. Ultimately, the queue messages would be processed using a SQL procedure that would calculate the auditing data. If necessary, the procedure could be written in C# and enabled with CLR integration.

A third option is to store the data from the INSERTED and the DELETED tables in a separate table (an auditing messages table) and use a timer job to retrieve the items. The timer job reads records out of the table on a schedule, creates project queue messages based on the data, and deletes the records from the table. Later, the message can be processed and the information used to calculate auditing data. With this third option, the auditing processing gets properly deferred via the project server queue, and because the timer job can exist as part of the business layer, environment-related issues are not problematic. This third option will be described in the auditing architecture disclosed herein.

The separate table stores the data from the INSERTED and the DELETED tables to enable the auditing code to create the baseline table and difference table rows. The data from the INSERTED and the DELETED tables is used for comparing the updated values against the previous values. By maintaining all of the trigger messages in a single table, there is a need to know which table was updated. Lastly, if the user updates the data in a non-standard way (such as via query analyzer), there is a need to know the username (for the database user, in particular) and timestamp.

Therefore, the auditing messages table has the following exemplary schema:

| | |
|---|---|
| MESSAGE_ID | INT NOT NULL IDENTITY(1,1), |
| MESSAGE_TYPE | INT NOT NULL, |
| SUSER_SNAME | NVARCHAR(128) NOT NULL, |
| MOD_DATE | DATETIME NOT NULL, |
| FEATURE_UID | UNIQUEIDENTIFIER NOT NULL, |
| TABLE_NAME | NVARCHAR(128) NOT NULL, |
| AUDITING_XML | XML, |
| INSERTED_XML | XML, |
| DELETED_KEYS_XML | XML |

Using the above schema, a general-purpose trigger can be written for a project table named MSP_TABLE with primary key column PK_COL as follows:

```
-- Create a trigger on table MSP_TABLE with primary key
column PK_COL
    CREATE TRIGGER MSP_TABLE_AUDITING_TRIGGER
    ON MSP_TABLE AFTER INSERT, UPDATE, DELETE AS
        INSERT INTO MSP_AUDITING_MESSAGES
(MESSAGE_TYPE SUSER_SNAME, MOD_DATE, FEATURE_UID,
TABLE_NAME, INSERTED_XML, DELETED_KEYS_XML)
        SELECT
            1,
            SUSER_SNAME( ),
            GETDATE( ),
            PSSQL_Feature_Uid,
            'MSP_TABLE',
            (SELECT * INSERTED FOR XML AUTO),
            (SELECT * FROM DELETED FOR XML AUTO)
    GO
```

Note that this query is simplified in a few ways. First, a join would need to be performed on the physical table to obtain the select text, ntext, or image columns from the INSERTED table of the inserted rows. Second, only the primary key columns of the deleted table are desired. This can be accomplished by performing a left join on the INSERTED table and selecting only the primary key columns to avoid updated rows. However, in an alternative implementation, all of the relevant data on the server is desired, rather than just the primary key columns.

Deploying such a trigger on all of the project tables ensures that all updates on the server are reflected in a row of the MSP_AUDITING_MESSAGES table. It is not desired to audit all changes (e.g., not audit the RES_LAST_ACTIVITY column or checkin/checkouts); however, in some cases all changes are audited. If code is added to ignore some updates, the logic for some tables would be slightly more complex.

Capturing all of the server updates in the MSP_AUDITING_MESSAGES table is a good auditing solution for the server. However, the table captures too much data and threatens the scalability of the product, since this is a replication of data rather than differences in the data. Instead, rows are read from the table, a queue message is created to defer the auditing processing, and some time later, the new baseline and difference rows are calculated.

Figure 5:
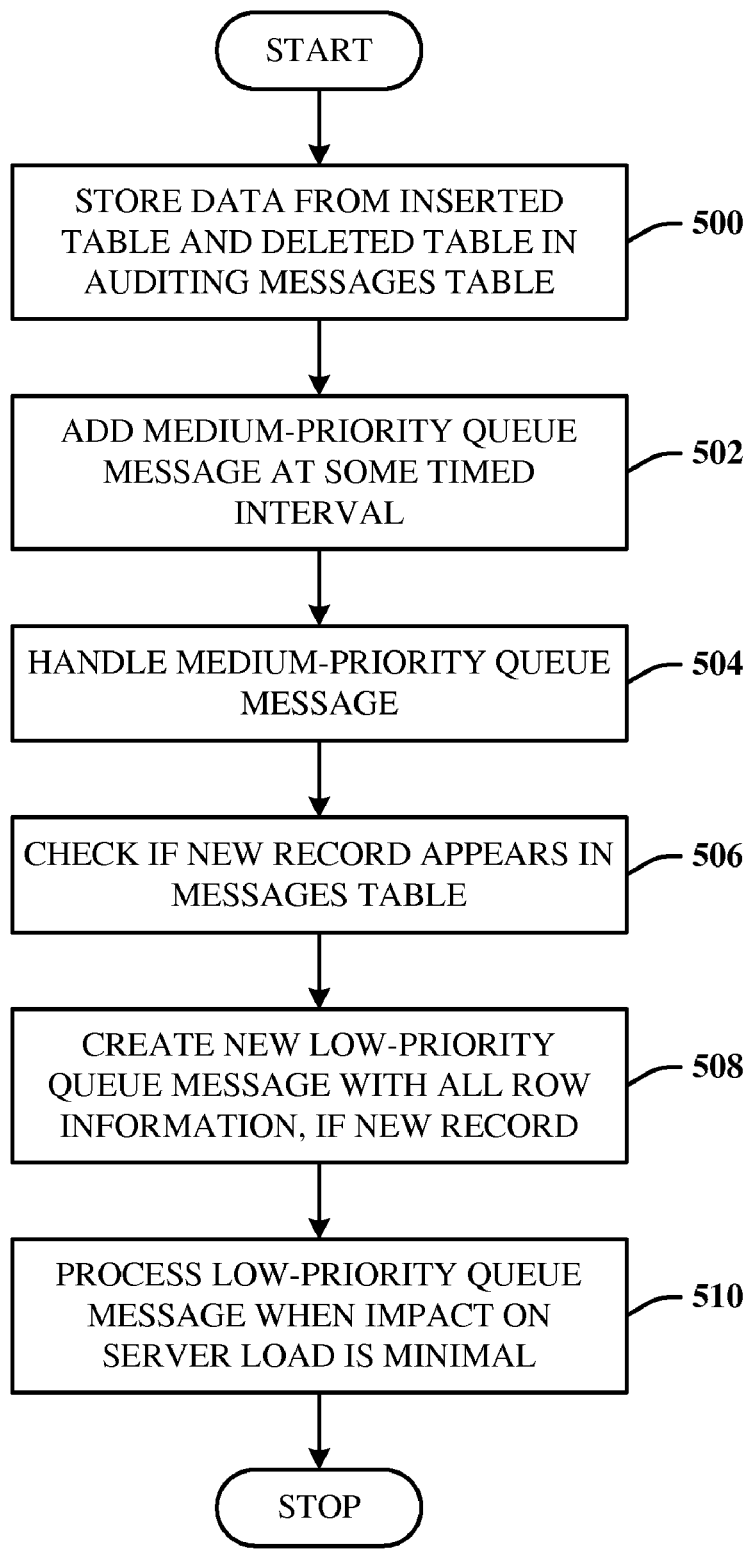
FIG. 5 illustrates a method of notifying the auditing system about updates differences calculations.

After records have been added to the MSP_AUDITING_MESSAGES table, the auditing system is notified about the updates and data for difference calculations is provided. FIG. 5 illustrates a method of notifying the auditing system about updates differences calculations. At 500, data from the inserted and deleted tables is stored in the auditing messages table. At 502, a medium-priority queue message is added at some timed interval. At 504, the medium-priority queue message is handled. At 506, a check is performed to determine if a new record exists in the auditing messages table. At 508, if a new record appears in the messages table (e.g., MSP_AUDITING_MESSAGES table), a new low-priority queue message is created with all of the information from the row. Although differences could be calculated during the first message handler, such a design affects core performance since the medium-priority messages will be handled frequently and on timed intervals. Instead, a queue timer job allows frequent clearing of the MSP_AUDITING_MESSAGES table and creating low-priority jobs that defer the auditing processing. Eventually, when the load on the server is low, the low-priority auditing message is processed, as indicated at 510.

The low-priority auditing message contains the identifier of the user that performed the update, the timestamp of the update, the name of the table that was updated, the INSERTED table XML, and the DELETED table XML.

Figure 6:
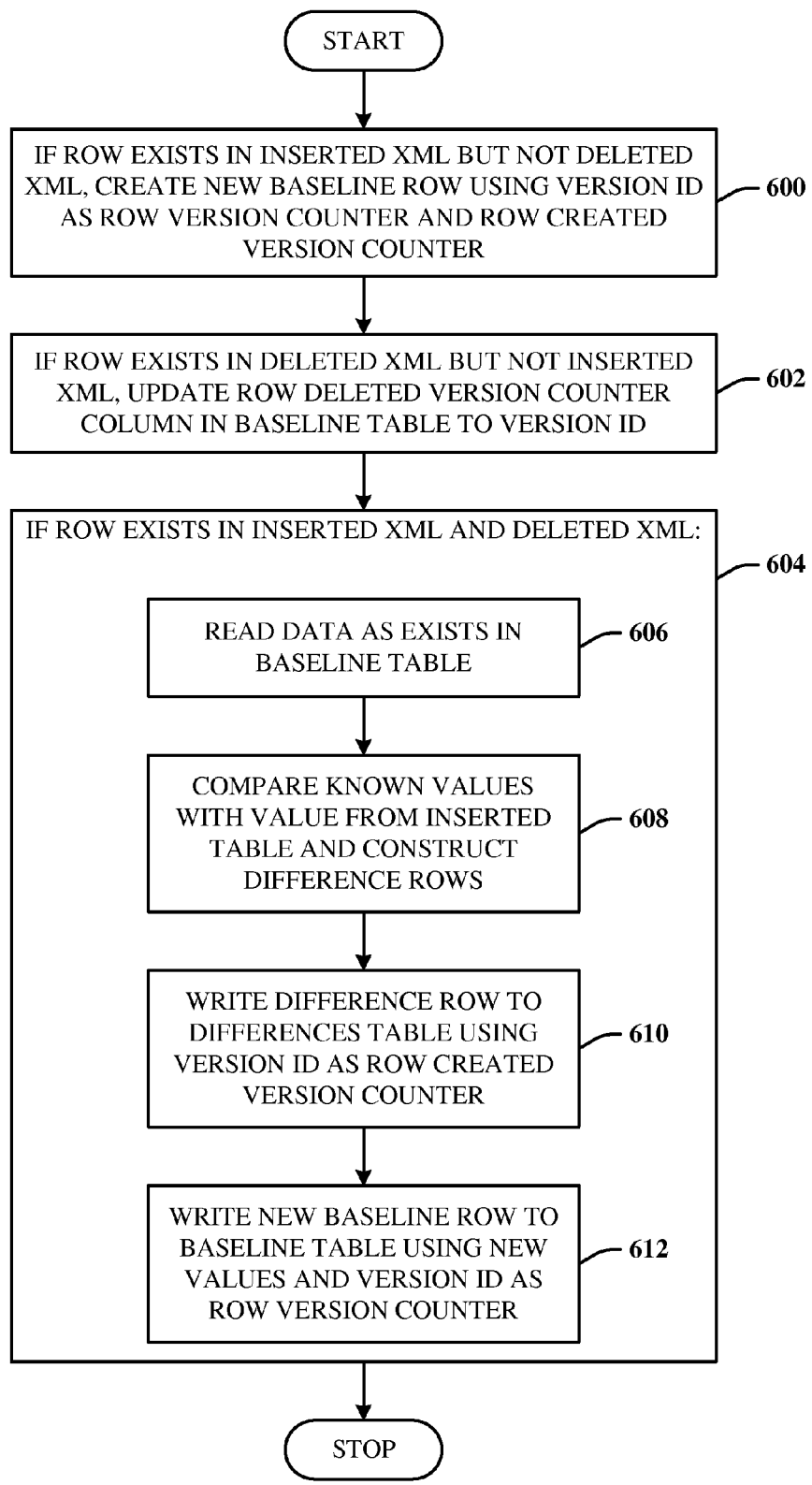
FIG. 6 illustrates a method of creating baseline and difference rows in accordance with the auditing architecture.

A first task of the handler is to associate the queue message with a feature version. A second task of the handler is to create the baseline and differences rows. FIG. 6 illustrates a method of creating baseline and difference rows in accordance with the auditing architecture. At 600, if the row exists in the inserted XML but not the deleted XML, a new baseline row is created using the version_id as the row_version_counter and the row_created_version_counter. Alternatively, at 602, if the row exists in the deleted XML but not the inserted XML, the row_deleted_version_counter column in the baseline table is updated to the version_id. Alternatively, at 604, if the row exists in both the inserted and deleted XML, the data is read as the data exists in the baseline table, as indicated at 606. This may not be necessary since the data should be equivalent to the deleted table XML. At 608, the known values are compared with the values from the inserted table and a dataset of difference rows is constructed. At 610, the difference rows are written to the differences table using the version_id as the row_created_version_counter. At 612, the new baseline row is written to the baseline table using the new values and the version_id as the row_version_counter.

The schema of the baseline table matches the project table plus the additional version counters. The differences tables can have the following exemplary schema:

| | |
|---|---|
| PK_COL | UNIQUEIDENTIFIER NOT NULL, |
| WFIELD_NAME | VARCHAR(255) NOT NULL, |
| OLD_VALUE | NVARCHAR(MAX), |
| OLD_VALUE_BINARY | VARBINARY(MAX), |
| ROW_CREATED_VERSION_COUNTER | INT NOT NULL |

Version counters play an integral role in recounting data history. The version tables can use the following version counters:

OBJECT_VERSION_COUNTER INT NOT NULL,

Baseline tables can use the following version counters:

| | |
|---|---|
| ROW_CREATED_VERSION_COUNTER | INT NOT NULL DEFAULT 0, |
| ROW_DELETED_VERSION_COUNTER | INT NOT NULL DEFAULT -1, |
| ROW_PREVIOUS_VERSION_COUNTER | INT NOT NULL DEFAULT 0, |
| ROW_VERSION_COUNTER | INT NOT NULL DEFAULT 0 |

Differences tables can use the following version counter:

| | |
|---|---|
| ROW_CREATED_VERSION_COUNTER | INT NOT NULL |

The auditing architecture also provides the user with other useful scenarios that are described here. The auditing feature allows users to maintain historical data for certain enterprise objects as partial auditing rather than auditing everything on the server. For instance, a company may be interested in maintaining historical data for project and permission changes, but may not need to audit previous status reports.

The following auditing business object provides a method that allows users to update this setting:

```
public void UpdateAuditingFeatures(AuditingFeatureDataSet
    vfds)
```

The setting can be reflected in the database table MSP_AU-DITING_AUDITING_FEATURES, according to the following schema:

```
FEATURE_UID     UNIQUEIDENTIFIER NOT NULL,
FEATURE_NAME    NVARCHAR(255) NOT NULL,
FEATURE_DESC    NVARCHAR(255),
AUDIT_FEATURE   BIT NOT NULL
```

Users can also update the names of versions for features that support reading previous versions so that a UI can reflect meaningful changes. For instance, if a custom field is updated for some purpose, the user can update the name of the version to note the purpose of the change.

FIG. 7 illustrates an exemplary user interface (UI) 700 for managing auditing in accordance with the disclosed auditing architecture. The UI 700 for auditing is admin-centric. A manage auditing page allows administrators with the "manage auditing" permission to change whether particular features are audited. If the administrator selects one of the features in the first column, the application navigates to an auditing details page. The auditing details page allows users to enable or disable auditing for a particular feature, see which user made changes to the relevant objects, and in the case of versioning, name the particular version. The auditing UI 700 also appears on the pages for features where versioning is enabled. For example, on an enterprise lookup table page, users can be presented with a new context menu that allows the users to perform common operations such as deleting, copying, etc., and also viewing previous versions of the lookup table.

Figure 8:
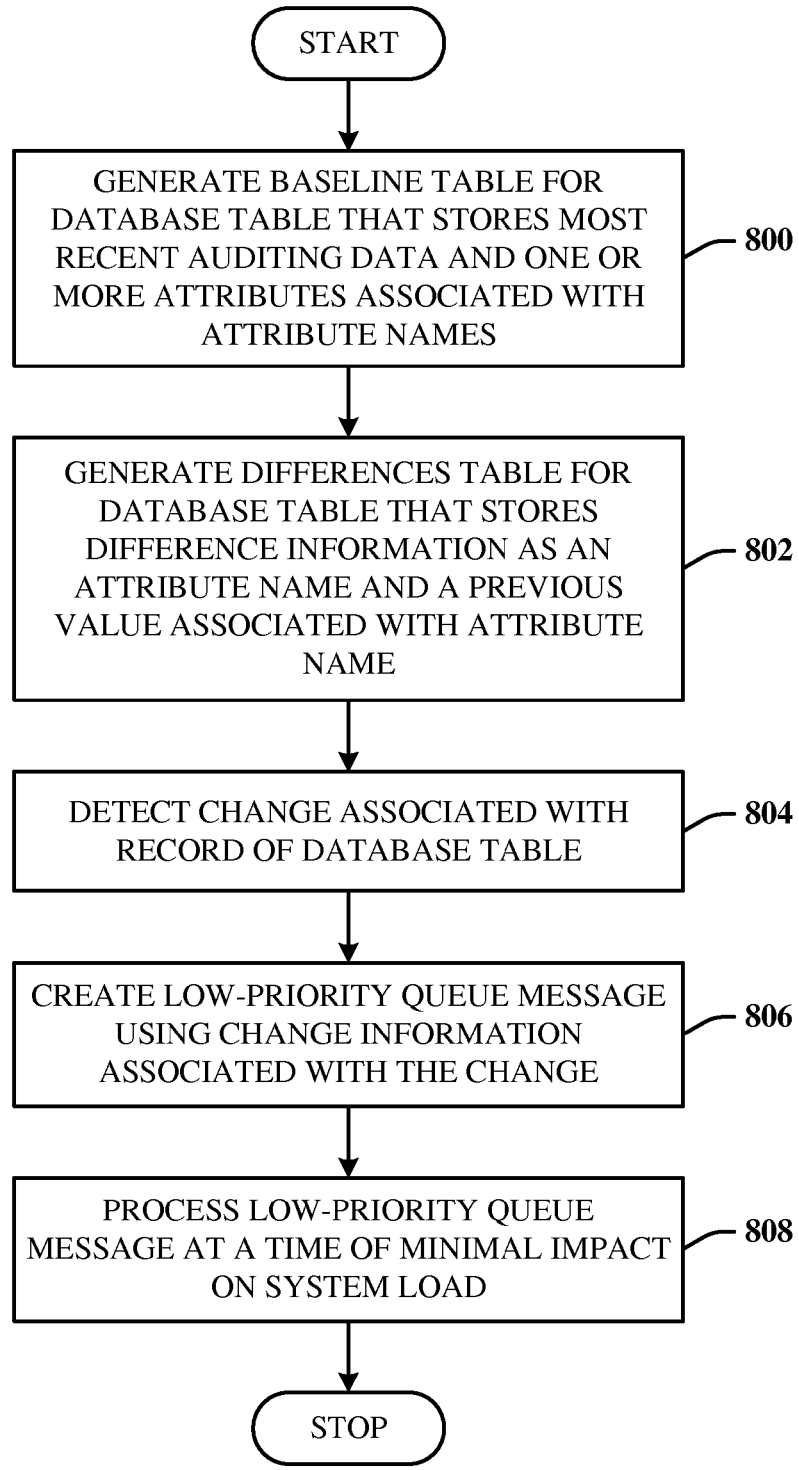
FIG. 8 illustrates a computer-implemented method of auditing data.

FIG. 8 illustrates a computer-implemented method of auditing data. At 800, a baseline table is generated for a database table that stores most recent auditing data and one or more attributes associated with corresponding attribute names. At 802, a differences table is generated for the database table that stores difference information as an attribute name and a previous value associated with the attribute name. At 804, a change associated with a record of the database table is detected. At 806, a low-priority queue message is created using change information associated with the change. At 808, the low-priority queue message is processed at a time of minimal impact on system load.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 9:
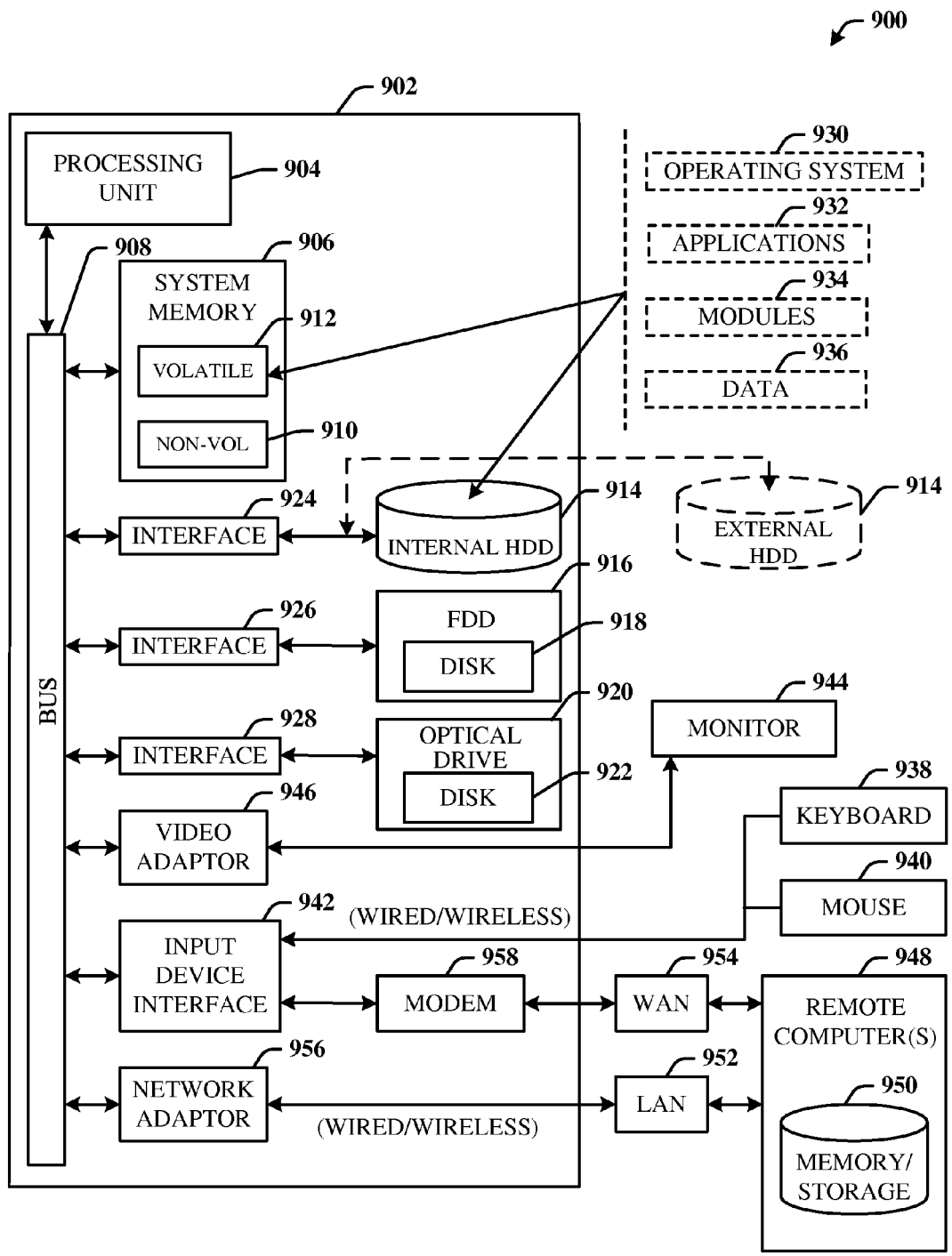
FIG. 9 illustrates a block diagram of a computing system operable to execute server auditing in accordance with the disclosed architecture.

Referring now to FIG. 9, there is illustrated a block diagram of a computing system 900 operable to execute server auditing in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS stores the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 may also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 912, including an operating system 930, one or more application programs 932, other program modules 934, and program data 936. All or portions of the operating system, applications, modules, and/or data can also be cached in the volatile memory 912. It is to be appreciated that the disclosed architecture can be implemented with various commercially available operating systems or combinations of operating systems.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented auditing system, comprising:
   a tracking component that is dynamically generated for tracking changes in a data record as part of an auditing process, the tracking component comprising an up-to-date data record corresponding to an active database table, and a differences record corresponding to differences relative to previous changes in the up-to-date data record;
   a priority component for asynchronously processing the changes according to priority-based queue messages, the priority component defers processing of the changes to times of reduced system load by assigning lower-priorities to the changes relative to priorities assigned to non-auditing messages; and a processor that executes computer-executable instructions associated with at least the tracking component and the priority component.

2. The system of claim 1, wherein the tracking component is dynamically generated based on a database trigger associated with an insert, delete or update operation on a table.

3. The system of claim 1, wherein the up-to-date data record includes an auditing baseline table for storing latest information of the data record and the differences record comprises an auditing differences table for storing an attribute name and a previous value associated with the data record.

4. The system of claim 3, wherein the auditing baseline table includes a single up-to-date data record that stores the latest information of the data record.

5. The system of claim 3, wherein the auditing differences table stores incremental differences information related to the changes to the data record.

6. The system of claim 1, wherein the priority component is an asynchronous priority queue that stores auditing messages and non-auditing messages related to database operations.

7. The system of claim 6, wherein the priority component defers processing of the auditing messages to a time of reduced system load by assigning lower-priorities to the auditing messages relative to priorities assigned to the non-auditing messages.

8. The system of claim 1, further comprising a timer component for executing a timer job that clears auditing messages and creates low-priority jobs that defer the auditing process to times of reduced system load.

9. The system of claim 1, wherein the tracking component includes a versions table that uniquely identifies table updates associated with a single logical database operation as a single version of a feature.

10. The system of claim 1, further comprising an auditing message table for storing data for comparing update values to previous values, a username, a timestamp, and a table name.

11. A computer-implemented server auditing system, comprising:

a baseline table of a database table for storing most recent auditing data comprising a duplicate of the database table and specific auditing attributes;

a differences table of the database table for storing difference information relative to the most recent auditing data, the difference information comprising an attribute name and a previous value of the most recent auditing data;

a database trigger for detecting an insert, update, or delete change made to the database table;

an asynchronous priority queue for processing a low-priority queue message based on the database trigger; and a processor that executes computer-executable instructions associated with at least one of the baseline table, differences table, database trigger, or priority queue.

12. The system of claim 11, further comprising a versions table that facilitates processing updates on a per-feature basis that groups all related updates to database tables into a single version.

13. The system of claim 11, wherein the low-priority queue message is processed after synchronous and non-auditing asynchronous operations have been processed.

14. A computer-implemented method of auditing data, comprising acts of:

generating a baseline table for a database table that stores most recent auditing data corresponding to a duplicate of the active database table and one or more attributes having one or more associated attribute names;

generating a differences table for the database table that stores difference information as an attribute name and a previous value of the most recent auditing data associated with the attribute name;

detecting an insert, update, or delete change associated with a record of the database table;

creating a low-priority queue message using change information associated with the change;

processing the low-priority queue message at a time of minimal impact on system load; and utilizing a processor that executes instructions stored in memory to perform at least one of the acts of generating, detecting, creating, and processing.

15. The method of claim 14, further comprising processing the low-priority queue message asynchronously after higher-priority operations complete.

16. The method of claim 14, wherein the most recent auditing data is a single record on which the difference information is based.

17. The method of claim 14, further comprising recreating data according to an earlier timestamp by applying a single differences table row per attribute.

18. The method of claim 14, further comprising processing changes on a per-feature basis by grouping all related changes as a single version for storage in a version table.

19. The method of claim 14, further comprising storing a trigger to a table, the trigger automatically calling a procedure based on the detected change in the record.

20. The method of claim 14, further comprising capturing server updates in a messages table, and processing a medium-priority queue message at a scheduled time interval based on a new record in the message table.

* * * * *